(12) United States Patent
Hosokubo

(10) Patent No.: US 7,710,948 B2
(45) Date of Patent: May 4, 2010

(54) PCM-BASED DATA TRANSMISSION SYSTEM AND VOICE/DATA COMMUNICATION SWITCHING METHOD

(75) Inventor: Takao Hosokubo, Shizuoka (JP)

(73) Assignee: NEC Corporation, Tokyo (JP)

( * ) Notice: Subject to any disclaimer, the term of this patent is extended or adjusted under 35 U.S.C. 154(b) by 1461 days.

(21) Appl. No.: 11/071,238

(22) Filed: Mar. 4, 2005

(65) Prior Publication Data
US 2005/0195803 A1    Sep. 8, 2005

(30) Foreign Application Priority Data
Mar. 4, 2004    (JP)    .............................. 2004-059988

(51) Int. Cl.
*H04L 12/66*    (2006.01)
*H04J 1/02*    (2006.01)
(52) U.S. Cl. ....................... 370/353; 370/493; 370/522; 375/242
(58) Field of Classification Search ................. 370/433, 370/434, 435, 493, 353
See application file for complete search history.

(56) References Cited

U.S. PATENT DOCUMENTS

| | | | | |
|---|---|---|---|---|
| 4,528,659 A | * | 7/1985 | Jones, Jr. ..................... | 370/435 |
| 4,813,040 A | * | 3/1989 | Futato ......................... | 370/528 |
| 5,436,899 A | * | 7/1995 | Fujino et al. ................. | 370/433 |
| 5,615,297 A | * | 3/1997 | Davis .......................... | 704/201 |
| 5,878,120 A | * | 3/1999 | O'Mahony ............... | 379/93.09 |
| 5,973,629 A | * | 10/1999 | Fujii ............................ | 341/76 |
| 6,018,520 A | * | 1/2000 | Okada ......................... | 370/336 |
| 7,330,466 B2 | * | 2/2008 | Hosokubo ................... | 370/352 |

FOREIGN PATENT DOCUMENTS

| | | |
|---|---|---|
| JP | S60-103837 | 6/1985 |
| JP | S63-69364 | 3/1988 |
| JP | S63-69364 A | 3/1988 |
| JP | H07-58804 * | 3/1995 |
| JP | H07-58804 A | 3/1995 |

* cited by examiner

*Primary Examiner*—Gregory B Sefcheck
*Assistant Examiner*—Suk Jin Kang
(74) *Attorney, Agent, or Firm*—Sughrue Mion, PLLC

(57) ABSTRACT

A transmitting terminal creates a data PCM stream in which data is recognized as a PCM stream by placing a prefixed idle code string before data to transmit and a postfixed idle code string after the data to transmit. By switching between a voice PCM stream and a data PCM stream, PCM steam is transmitted to a receiving terminal. The receiving terminal, when detecting the prefixed idle code string from a received PCM stream, receive the data from the transmitting terminal until detecting the postfixed idle code string.

12 Claims, 4 Drawing Sheets

PCM-BASED DATA TRANSMISSION SYSTEM AND VOICE/DATA COMMUNICATION SWITCHING METHOD

BACKGROUND OF THE INVENTION

1. Field of the Invention

The present invention relates to a PCM (Pulse Code Modulation)-based communications system and, more particularly, to a system and a method which enable data to be transmitted and received using PCM coding.

2. Description of the Related Art

In recent years, as IP networks advance, the VoIP (Voice over IP) technologies are becoming important factors in network communications. In parallel, there is a growing trend among VoIP telephony service providers to guarantee communication quality by employing the PCM-based recommendation G.711 as a voice encoding method and securing a bandwidth for UDP (User Datagram Protocol) packets. Meanwhile, as mobile telephones, or those with digital cameras, become widespread, the uses of the service of transmitting instant messages, still images and the like are dramatically increasing in number.

Therefore, there is a need for a simple data-transmission technology that places no burden on a network. In ISDN (Integrated Services Digital Network), a B channel enables both a conversation service and a data communication service to be used. However, it has a problem that a burden on a network is increased because there is a need to setting a service mode per call at the network side.

As a method for switching between communication modes (voice communication mode and data communication mode) on the terminal sides without network-side control, for example, Japanese Patent Unexamined Application Publication No. S63-69364 discloses a communication mode switching system. According to this prior art, switching control is performed as follows. When switching to the data communication mode during the voice communication mode, the switching is done by transmitting a signal that can pass through a voice band, such as a multifrequency signal or a push-button signal. When switching to the voice communication mode during the data communication mode, the switching is done by transmitting a specific signal code.

Moreover, Japanese Patent Unexamined Application Publication No. H7-58804 discloses a voice-data composite communication system in which a start flag $F_S$ and an end flag $F_E$, each having six or more consecutive "1"s, are added before and after a data signal, respectively, thereby making it possible for the receiving side to distinguish between voice and data.

However, in any of the above-mentioned prior arts, no consideration is given to PCM-based voice communications.

Moreover, in the communication mode switching system described in Japanese Patent Unexamined Application Publication No. S63-69364, special control signals (such as the push-button signal and the specific signal code), apart from communicated information, are transmitted to the other end of the line through a network, resulting in increased traffic on the network.

In the voice data composite communications system described in Japanese Patent Unexamined Application Publication No. H7-58804, it is necessary to add the start flag $F_S$ and the end flag $F_E$, each having six or more consecutive "1"s as not occurring in voice signals and data signals. In other words, a string of consecutive bits at an arbitrary value, which does not exist in a voice signal and a data signal, is used as a flag. Accordingly, it is necessary to provide the receiving side with a means for detecting such special start and end flags, resulting in complicated circuit structure.

SUMMARY OF THE INVENTION

It is an object of the present invention to provide a novel data transmission system and method based on PCM coding without burdening a network.

Moreover, it is another object of the present invention to provide a method of switching between communication modes using PCM coding without the need of network-side control and with a simple configuration.

The inventor has given his attention to the following facts. In normal PCM voice communications, the level of PCM data is not more than 0 dBm in terms of an analog signal input and therefore the level of an idle code (="FFh") cannot occur. Moreover, the maximum input value of a PCM encoder is approximately +3 dBm and therefore the level of PCM data cannot reach the idle code, which is the maximum level. Accordingly, such an idle code can be used to control switching between voice and data communications.

According to an aspect of the present invention, a transmitting terminal inputs data to be transmitted, generates a prefixed idle code string of a first predetermined length located before the data to be transmitted, generating a postfixed idle code string of a second predetermined length located after the data to be transmitted, switches between a voice PCM stream and a data PCM stream comprising the prefixed idle code string, the data to be transmitted and the postfixed idle code string, to transmit to the receiving terminal. The receiving terminal receives a PCM stream from the transmitting terminal, detects the prefixed idle code string and the postfixed idle code string from a received PCM stream, and receives the data located between the prefixed idle code string and the postfixed idle code string.

The receiving terminal may generate a silence PCM stream from when the prefixed idle code string is detected to when the postfixed idle code string is detected. The voice PCM stream may be decoded to reproduce a voice signal before detecting the prefixed idle code string and after detecting the postfixed idle code string. The silence PCM stream is decoded from when the prefixed idle code string is detected to when the postfixed idle code string is detected. The prefixed idle code string and the postfixed idle code string may be composed of a given number of consecutive idle codes.

The prefixed idle code string and the postfixed idle code string may be detected by counting a number of consecutive idle codes; determining whether the number of consecutive idle codes reaches the given number; and when the number of consecutive idle codes is equal to the given number, switching an operation mode between a voice communication mode and a data communication mode.

According to another aspect of the present invention, the transmitting terminal includes: a PCM encoder for encoding a voice signal to produce a voice PCM stream; a data converter for generating a data PCM stream comprising a prefixed idle code string of a first predetermined length located before data to be transmitted and a postfixed idle code string of a second predetermined length located after the data to be transmitted; a first switch for switching between the voice PCM stream and the data PCM stream; and a transmitter for transmitting a PCM stream outputted from the first switch to the receiving terminal. The receiving terminal includes: a receiver for receiving a PCM stream from the transmitting terminal; a detector for detecting the prefixed idle code string and the postfixed idle code string from a received PCM stream; a PCM decoder for decoding the received PCM stream to reproduce a voice signal; a converter for converting the received PCM stream into parallel data; and a second switch for forwarding the received PCM stream to the converter when the prefixed idle code string is detected and to the PCM decoder when the postfixed idle code string is detected.

According to another aspect of the present invention, a communication terminal composed of a transmitting section and a receiving section which have the above-described transmitting and receiving functions may be realized.

According to still another aspect of the present invention, a communication mode switching method includes: at the transmitting terminal, generating a prefixed idle code string of a first predetermined length before data to be transmitted at a timing when a voice communication mode is changed to a data communication mode; generating a postfixed idle code string of a second predetermined length after the data to be transmitted at a timing when the data communication mode is changed to the voice communication mode; transmitting to the receiving terminal a voice PCM stream and a data PCM stream comprising the prefixed idle code string, the data to be transmitted, and the postfixed idle code string; and at the receiving terminal, detecting the prefixed idle code string and the postfixed idle code string from a received PCM stream; and switching its communication mode between the voice communication mode and the data communication mode depending on which one of the prefixed idle code string and the postfixed idle code string is detected.

As described above, according to the present invention, switching between voice communication and data communication is controlled by using an idle code string. This makes it possible to switch between voice and data communication modes, as well as to transmit data, within a bandwidth for conversation secured in a network, without using a control channel of the network. Accordingly, the voice/data communications switching that places no burden on the network becomes feasible.

BRIEF DESCRIPTION OF THE DRAWINGS

DETAILED DESCRIPTION OF THE PREFERRED EMBODIMENTS (1) PCM Stream Transmitting Section FIG. 1 is a block diagram showing a PCM stream transmitting section of a transmitting-side terminal 10 in a data transmission system according to a first embodiment of the present invention. Here, it is assumed that a line is established between the transmitting-side terminal 10 and a receiving-side terminal 30 through a digital switching network 20. For the simplicity of the drawing, FIG. 1 only shows the PCM stream transmitting section-related configuration of the transmitting-side terminal 10, omitting a receiving section and the like of this terminal 10.

Referring to FIG. 1, the transmitting-side terminal 10 can transmit and receive a PCM stream, which will be described later, by using a transmitter/receiver 101 through the line established over the digital switching network 20. A timing signal generator 102 extracts a network synchronization signal from the digital switching network 20 and generates an 8-kHz sampling signal $S_S$, a frame signal $S_F$ and an 8-bit transmission timing signal $S_{T8}$.

Figure 1:
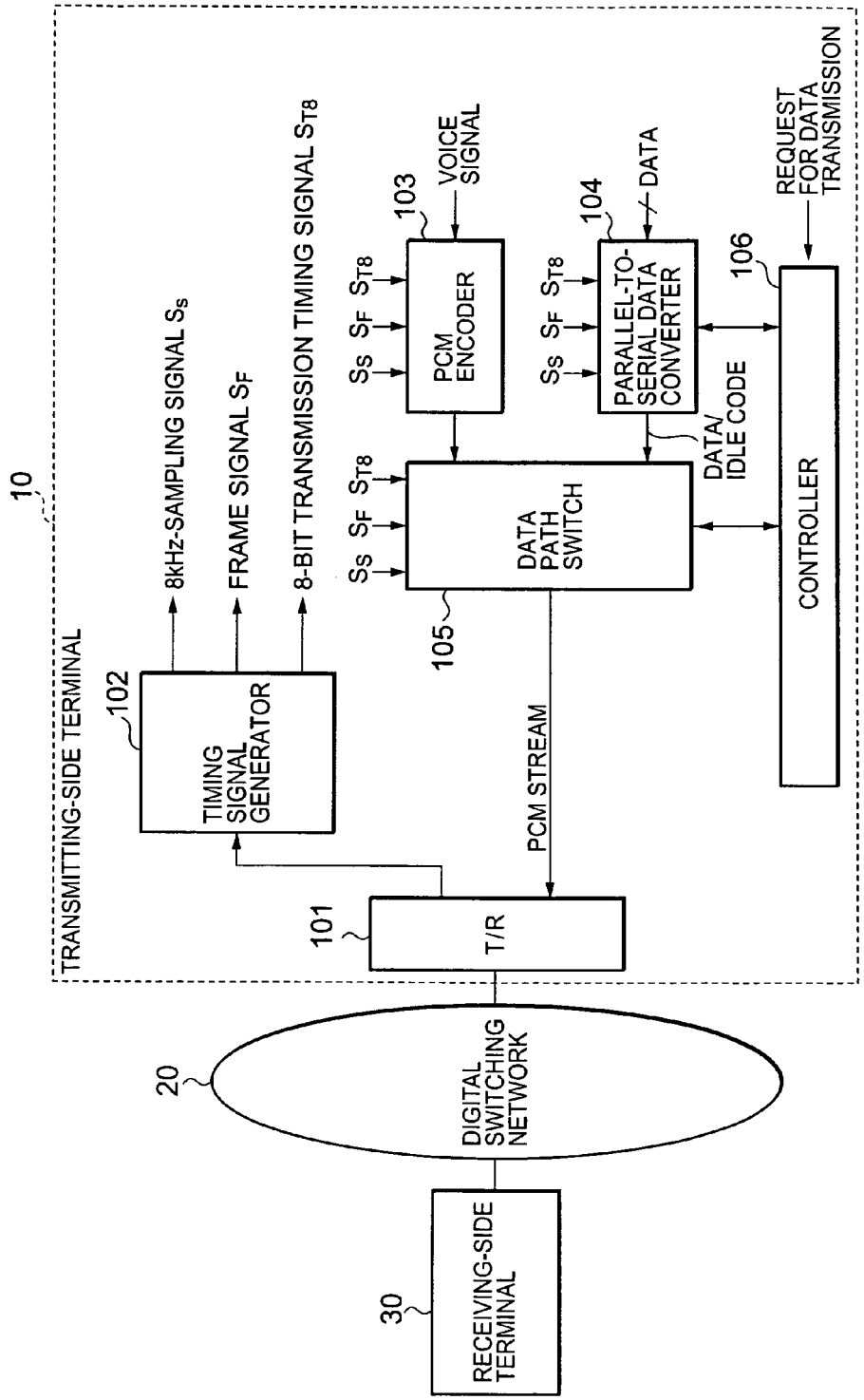
FIG. 1 is a block diagram showing a PCM stream transmitting section of a transmitting-side terminal in a data transmission system according to a first embodiment of the present invention.

The transmitting-side terminal 10 is provided with a PCM encoder 103, which performs PCM coding of an analog voice signal that has been restricted to a bandwidth from 300 Hz to 4000 Hz by using a band pass filter. In synchronization with the 8-kHz sampling signal $S_S$, frame signal $S_F$ and 8-bit transmission timing signal $S_{T8}$ fed from the timing signal generator 102, the PCM encoder 103 quantizes an inputted analog voice signal by using a predetermined companding method and creates an 8-bit PCM stream.

Parallel-to-Serial Data Conversion

The transmitting-side terminal 10 is also provided with a parallel-to-serial data converter 104, which converts parallel data, inputted from a computer or the like, to serial data. In synchronization with the 8-kHz sampling signal $S_S$, frame signal $S_F$ and 8-bit transmission timing signal $S_{T8}$ fed from the timing signal generator 102, the parallel-to-serial data converter 104 converts inputted parallel data to 8-bit serial data. Further, on an instruction from a controller 106, the parallel-to-serial data converter 104 outputs an idle code (in which all eight bits are "1") a given number of times in succession, at timings before and after the data to be transmitted. Accordingly, the output of the parallel-to-serial data converter 104 is a serial bit string composed of 8-bit data or 8-bit idle code.

The parallel-to-serial data converter 104 can be configured by using, for example, a buffer that accumulates data to be transmitted, and a parallel input/serial output shift register. When outputting an idle code, the parallel-to-serial data converter 104 takes the idle code in the shift register in synchronization with the 8-kHz sampling signal $S_S$ or frame signal $S_F$, and outputs the idle code by sequentially shifting it out in synchronization with the 8-bid transmission timing signal $S_{T8}$. When outputting data to be transmitted, the parallel-to-serial data converter 104 takes the data in the shift register via the buffer in synchronization with the 8-kHz sampling signal $S_S$ or frame signal $S_F$, and outputs the data by sequentially shifting it out in synchronization with the 8-bit transmission timing signal $S_{T8}$.

The 8-bit PCM stream, which is the output from the PCM encoder 103, and the 8-bit serial data, which is the output from the parallel-to-serial data converter 104, are outputted to a data path switch 105. The data path switch 105 outputs a selected one of the 8-bit PCM stream and the 8-bit serial data in accordance with the control by the controller 106, in synchronization with the 8-kHz sampling signal $S_S$, frame signal $S_F$ and 8-bit transmission timing signal $S_{T8}$ fed from the timing signal generator 102.

The controller 106 can perform data transmission, even during voice communications, in response to a request for data transmission from a computer. Therefore, when voice is being transmitted, the controller 106 controls the data path switch 105 so that it selects the 8-bit PCM stream from the PCM encoder 103. When a request for data transmission occurs, the controller 106 controls the data path switch 105 so that it selects the 8-bit serial data from the parallel-to-serial data converter 104. The data transmission rate is, for example, 64 kbps.

Data Transmitting Operation

Upon receiving the request for data transmission, the controller 106 instructs the parallel-to-serial data converter 104 to accumulate data to be transmitted in the buffer, to output idle codes as many as a given number of frames, and thereafter to sequentially output the data which has been accumulated in the buffer. When the data has been outputted and no data to be transmitted is left in the buffer, the parallel-to-serial data converter 104 outputs an interrupt signal to the controller 106. Upon receiving the interrupt signal, the controller 106 instructs the parallel-to-serial data converter 104 to transmit a data transmission end code, and subsequently to transmit idle codes as many as a given number of frames.

When the transmission of the idle codes as many as the given number of frames is finished, the controller 106 instructs the data path switch 105 to select and output the PCM stream from the PCM encoder 103. Thus, the PCM stream, which is selected and outputted by the data path switch 105, is sent out to the digital switching network 20 through the transmitter/receiver 101. Accordingly, the receiving side can determine the switching between voice communication and data communication by monitoring the consecutive idle codes as many as the given number of frames.

Note that the idle code ("FFh") is a code that represents the maximum level value and therefore the use of this code in the present invention is effective in any of the encoding laws, A-law and μ-law. Next, a detailed description will be given of the receiving-side terminal, which has a means for determining the voice/data switching as mentioned above.

(2) PCM Stream Receiving Section

Figure 2:
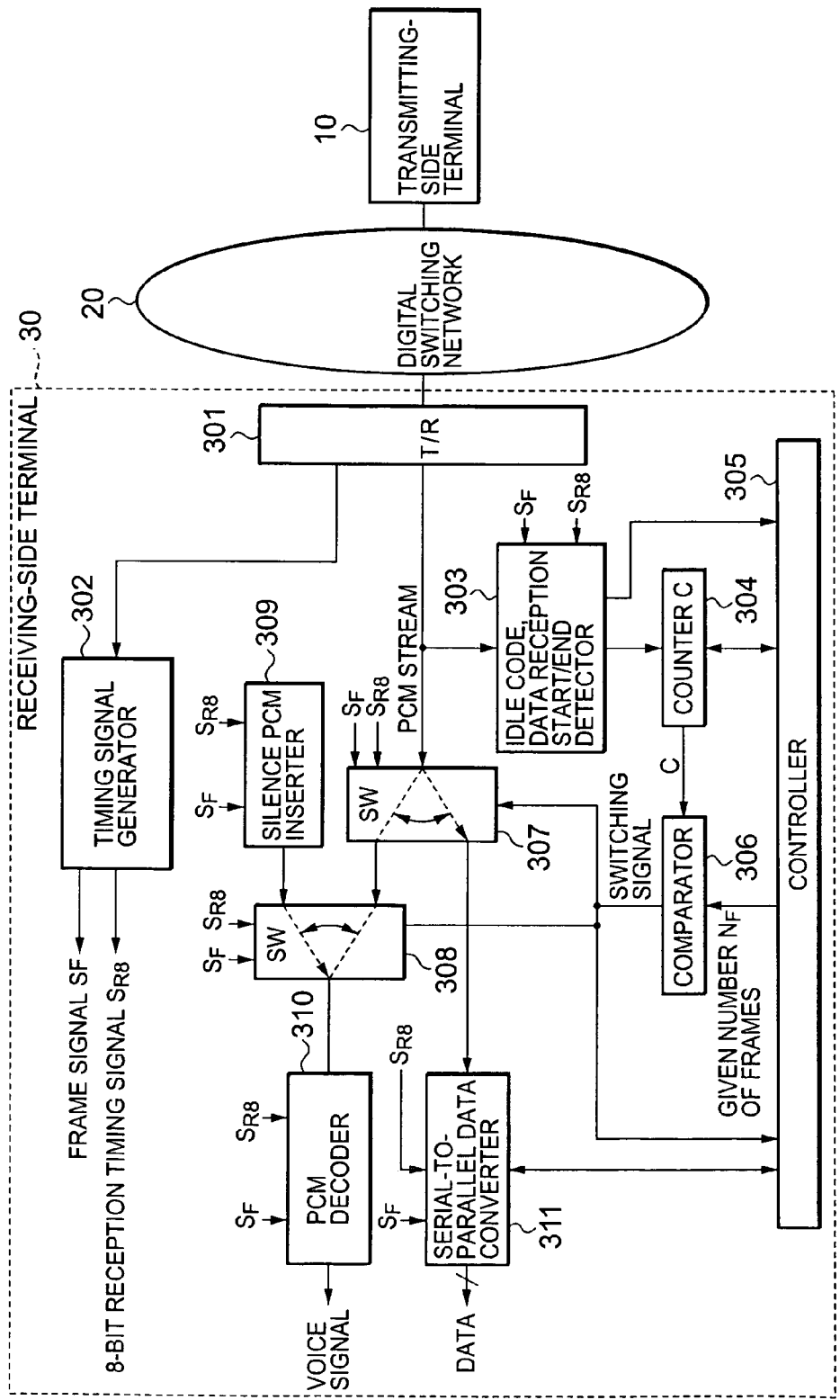
FIG. 2 is a block diagram showing a PCM stream receiving section of a receiving-side terminal in the data transmission system according to the first embodiment of the present invention.

FIG. 2 is a block diagram showing a PCM stream receiving section of the receiving-side terminal 30 in the data transmission system according to the first embodiment of the present invention. For the simplicity of the drawing, FIG. 2 only shows the PCM stream receiving section-related configuration of the receiving-side terminal 30, omitting a sending section and the like of this terminal 30.

Referring to FIG. 2, the receiving-side terminal 30 can transmit and receive a PCM stream, which will be described later, by using a transmitter/receiver 301 through the line established over the digital switching network 20. A timing signal generator 302 extracts a network synchronization signal from the digital switching network 20 and generates a frame signal $S_F$ and an 8-bit reception timing signal $S_{R8}$. A PCM stream, received by the transmitter/receiver 301, is outputted to each of a data path switch 307 and an idle code and data reception start/end detector 303.

In synchronization with the frame signal $S_F$ and 8-bit reception timing signal $S_{R8}$ fed from the timing signal generator 302, the idle code and data reception start/end detector 303 detects an idle code and data reception start/end code from the received PCM stream. The idle code and data reception start/end detector 303 increments a counter 304 every time it detects one idle code.

The counter 304 counts the number of times the idle code has been received, and outputs the count value C to a comparator 306. The comparator 306 compares the count value C with a given number $N_F$ (of frames). The given number $N_F$ may be set as appropriate. Depending on whether or not the count value C has reached the given number $N_F$, the comparator 306 outputs a switching signal to the data path switch 307 and, at the same time, outputs the switching signal, as an interrupt signal, to a controller 305. When receiving this interrupt signal, the controller 305 executes the switching processing to receiving mode, which will be described later. The controller 305 controls the entire sending and receiving operations of the terminal. Here, the controller 305 controls the operation state of the PCM stream receiving section.

In synchronization with the frame signal $S_F$ and 8-bit reception timing signal $S_{R8}$ fed from the timing signal generator 302, the data path switch 307 and a data path switch 308 concurrently execute switching operation according to the switching signal inputted from the comparator 306. More specifically, the data path switch 307 executes the switching operation such that the received PCM stream is outputted to the data path switch 308 when a voice PCM stream is being received, and such that the received PCM stream is outputted to a serial-to-parallel data converter 311 when a data PCM stream is being received. Meanwhile, the data path switch 308 executes the switching operation so as to output the received PCM stream, inputted from the data path switch 307, to a PCM decoder 310 when a voice PCM stream is being received, and so as to output a silence PCM stream inputted from a silence PCM inserter 309 to the PCM decoder 310 when a data PCM stream is being received.

In other words, when a voice PCM stream is being received, the received voice PCM stream is forwarded to the PCM decoder 310 via the data path switches 307 and 308. On the other hand, when a data PCM stream is being received, the received data PCM stream is forwarded to the serial-to-parallel data converter 311 via the data path switch 307, and at the same time, a silence PCM stream is forwarded to the PCM decoder 310 via the data path switch 308.

The silence PCM inserter 309 outputs PCM codes "00h" equivalent to a silence level, or a silence stream, in synchronization with the frame signal $S_F$ and 8-bit reception timing signal $S_{R8}$ fed from the timing signal generator 302. Alternatively, it may also be possible that the signal level is set to 0 V all the time by using a pull-down resistor.

The PCM decoder 310 decodes the PCM stream inputted from the data path switch 308, in synchronization with the frame signal $S_F$ and 8-bit reception timing signal $S_{R8}$ fed from the timing signal generator 302. As described above, when the transmitting-side terminal 10 has transmitted voice, the data path switch 308 outputs the received PCM stream, and therefore the voice signal from the transmitting side is decoded. When the transmitting-side terminal 10 has transmitted data, the data path switch 308 outputs the silence PCM stream, and therefore the silence voice signal is decoded.

In synchronization with the frame signal $S_F$ and 8-bit reception timing signal $S_{R8}$, the serial-to-parallel data converter 311 creates 8-bit parallel data from consecutive multiframes of the received PCM stream, inputted from the data path switch 307.

The function of each block in FIG. 2 can be configured with hardware. However, the functions can also be installed with software, by using a program-controlled processor, such as a CPU, as the controller 305. Hereinafter, a detailed description will be given of the voice/data receiving mode switching operation in the case of executing on a CPU a voice/data receiving program for the receiving-side terminal.

Voice/Data Reception Switching Operation

Figure 3:
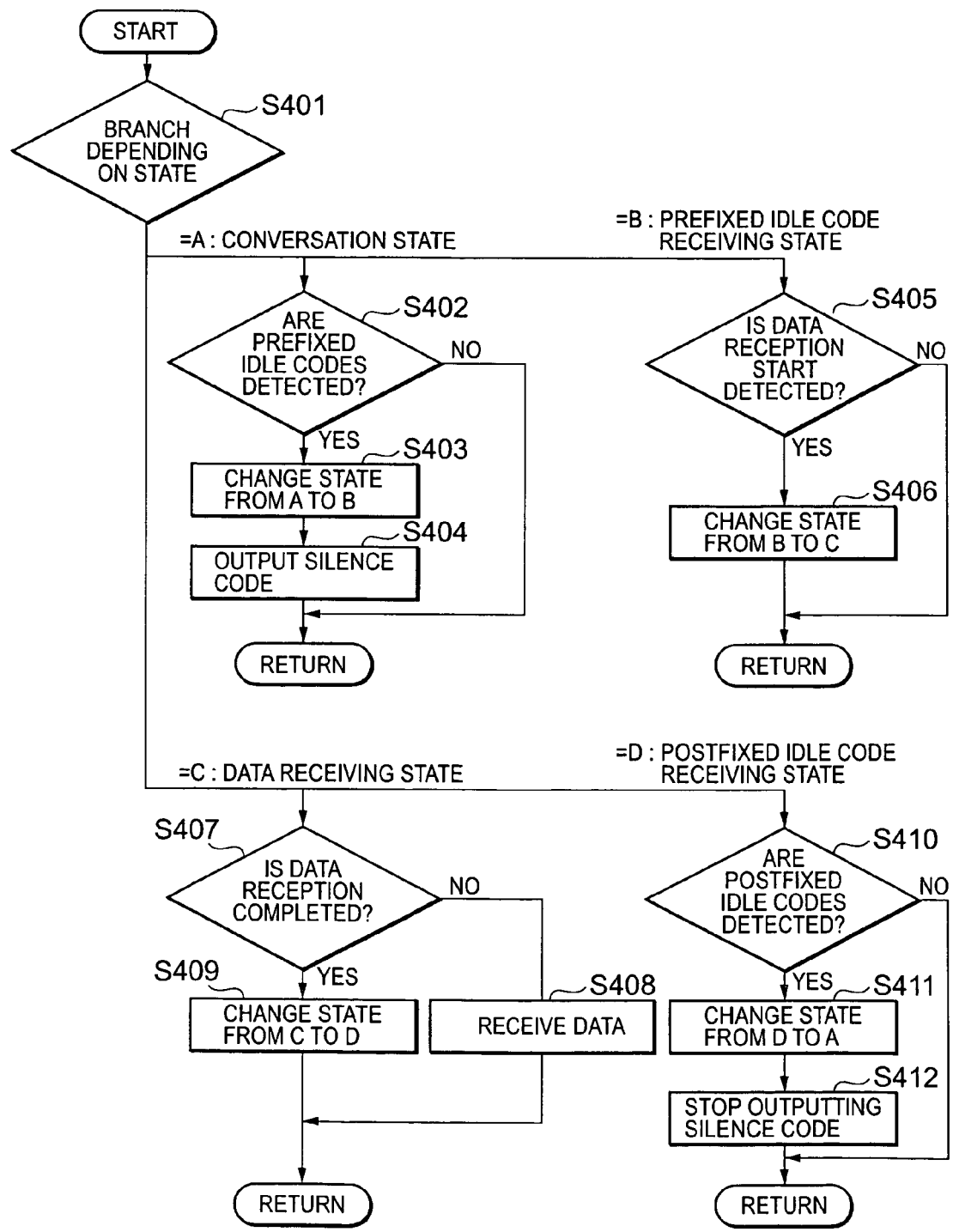
FIG. 3 is a flowchart showing an example of a method of switching between communication modes according to the first embodiment of the present invention.

FIG. 3 is a flowchart showing an example of a reception switching method according to the first embodiment of the present invention. The controller 305 monitors the reception state of the terminal at all times. In accordance with a current reception state, the controller 305 executes a selected one of a conversation state processing routine A, a prefixed idle code receiving state processing routine B, a data receiving state processing routine C, and a postfixed idle code receiving state processing routine D (Step S401).

In a conversation state where a voice PCM stream, passed through the data path switches 307 and 308, is being decoded by the PCM decoder 310, it is determined whether or not an interrupt signal occurs from the comparator 306, that is, whether or not prefixed idle codes as many as a given number of frames, which indicate the start of data transmission, have been received (Step S402). If the prefixed idle codes as many as the given number of frames have not been received (Step S402: NO), the states of the data path switches 307 and 308 are maintained as they are, whereby the decoding of the voice PCM stream is continued.

When the interrupt signal from the comparator 306 occurs and it is determined that the prefixed idle codes as many as the given number of frames have been received (Step S402: YES), then the controller 305 initiates the prefixed idle code receiving state processing routine B and shifts the state from the conversation state to the prefixed idle code receiving state (Step S403). With this shifting, the data path switches 307 and 308 are switched, whereby the received PCM stream is outputted to the serial-to-parallel data converter 311 via the data path switch 307, and silence PCM codes are outputted to the PCM decoder 310 via the data path switch 308 (Step S404).

Once in the prefixed idle code receiving state B, the controller 305 determines whether or not the idle code and data reception start/end detector 303 detects a data reception start flag, that is, whether or not data reception is started (Step S405). If the data reception has not been started (Step S405: NO), the serial-to-parallel data converter 311 does not output data. When the data reception is started (Step S405: YES), the controller 305 initiates the data receiving state processing routine C and shifts the state from the prefixed idle code receiving state to a data receiving state (Step S406). With this shifting, the received PCM stream inputted from the data path switch 307 is converted into parallel data by the serial-to-parallel data converter 311.

Once in the data receiving state, the controller 305 determines whether or not the idle code and data reception start/end detector 303 detects a data reception end flag, that is, whether or not the data reception is completed (Step S407). If the data reception has not been completed (Step S407: NO), the data reception is continued (Step S408). When the data reception is completed (Step S407: YES), the controller 305 initiates the postfixed idle code receiving state processing routine D and shifts the state from the data receiving state to a postfixed idle code receiving state (Step S409).

In the postfixed idle code receiving state, the controller 305 determines whether or not an interrupt signal occurs from the comparator 306, that is, whether or not postfixed idle codes as many as a given number of frames, which indicate the end of the data transmission, have been received (Step S410). If the postfixed idle codes as many as the given number of frames have not been received (Step S410: NO), the states of the data path switches 307 and 308 are maintained as they are.

When the interrupt signal from the comparator 306 occurs and it is determined that the postfixed idle codes as many as the given number of frames have been received (Step S410: YES), then the controller 305 initiates the conversation state processing routine A and shifts the state from the postfixed idle code receiving state to the conversation state (Step S411). With this shifting, the data path switches 307 and 308 are switched, whereby the received PCM stream is outputted to the PCM decoder 310 via the data path switches 307 and 308 and decoded into a voice signal. At the same time, the outputting of the silence PCM codes from the switch 308 is stopped (Step S412).

The number of frames used for the consecutively outputted idle codes, which indicate the start or end of data transmission, is not particularly defined. However, an unnecessarily large number may affect the period of time to switch from conversation to data transmission and from data transmission to conversation. Moreover, a noise sound might occur when switching from conversation to date transmission and from data transmission to conversation. However, this will not be a problem in practice if the lengths of the prefixed idle code string and the postfixed idle code string are adjusted to be short.

Incidentally, for the parallel-to-serial data converter 104 shown in FIG. 1 and the serial-to-parallel data converter 311 shown in FIG. 2, it is possible to use usual serial-communication devices capable of HDLC communication, Bi-SYNC communication and Mono-SYNC communication.

(3) Other Applications

Figure 4:
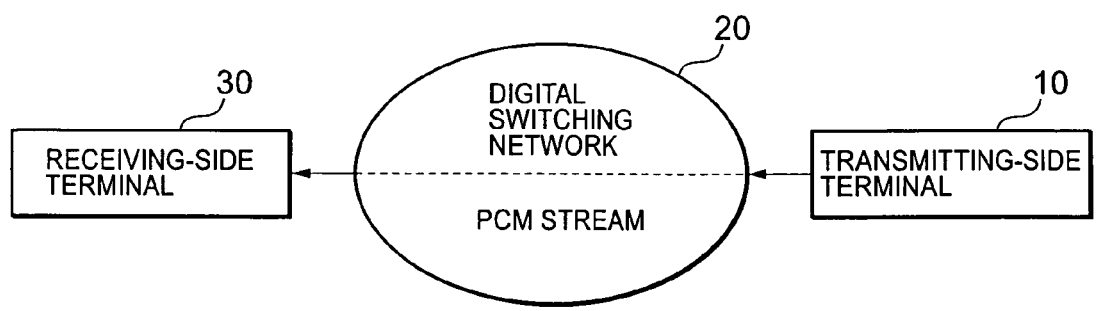
FIG. 4 is a schematic diagram of a communications system to which the first embodiment of the present invention is applied.

FIG. 4 is a schematic diagram of a communications system to which the first embodiment of the present invention is applied. A PCM stream as described above is transmitted from the transmitting-side terminal 10 to the receiving-side terminal 30 through a line over the digital switching network 20. However, the present invention is not limited to such a digital switching network, and the present invention can also be applied to a VoIP (Voice over IP) network.

Figure 5:
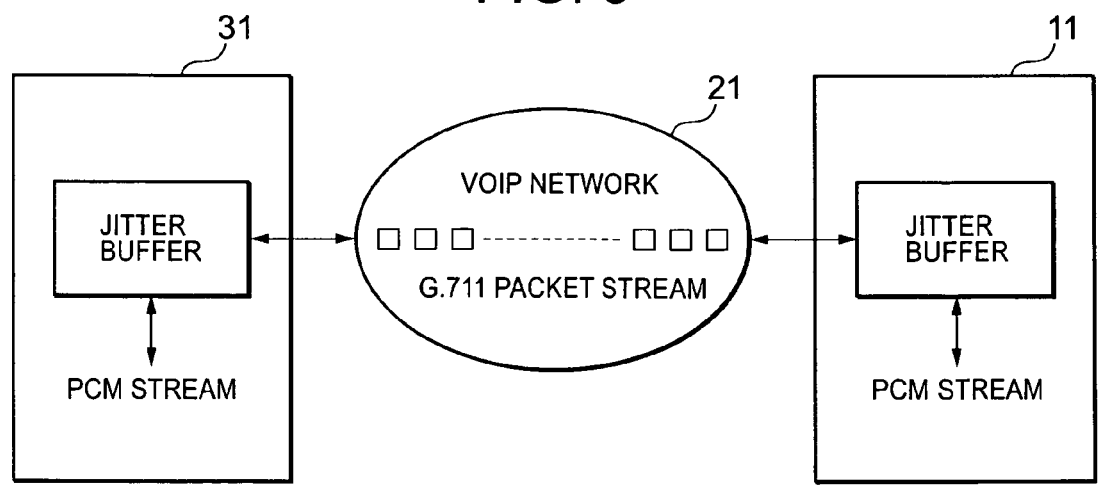
FIG. 5 is a schematic diagram of another communications system to which the first embodiment of the present invention is applied.

FIG. 5 is a schematic diagram of another communications system to which the first embodiment of the present invention is applied. Terminals 11 and 31 are connected to each other through a VoIP network 21 and exchange voice and data by using G.711 packet streams. In this system, each of the terminals 11 and 31 is provided with a jitter buffer, which absorbs jitter and the like of each packet, and a converter, which converts a PCM stream to packets and vice versa. The other configuration of this system related to the transmission/reception of a PCM stream is basically the same as those described in conjunction with FIGS. 1 and 2, and similar effects can be achieved. Therefore, a description thereof will be omitted.

According to the aforementioned embodiments, data communication is performed within a bandwidth for conversation secured in a network, without using a control channel of the digital switching network 20 and TCP packets of the VoIP network 21 conforming to G.711. Therefore, it is possible to transmit data without increasing control data traffic on the network, and without placing a burden on the network. The present invention is particularly effective as a method of transmitting data such as instant messages, which are heavily used by mobile telephones and the like, or as a transmission method of control data for control equipment that requires relatively high immediacy, such as a remote camera and a speaker of peripheral equipment connected to a remote terminal.

Additionally, while data is being communicated, voice from the transmitting-side terminal 10 to the receiving-side terminal 30 cannot be transmitted. However, such voice loss during the data communication period is thought to cause no problem in practice because this data communication is known to each of the users of the terminals. Furthermore, a noise sound might occur while switching from the conversation state to the data receiving state and from the data receiving state to the conversation state. Nonetheless, this will not be a problem in practice if the lengths of the prefixed idle code string and the postfixed idle code string are adjusted to be short.

The invention claimed is:

1. A method for transmitting a pulse code modulation (PCM) stream from a transmitting terminal to a receiving terminal through a network in a voice communication system, comprising:
   at the transmitting terminal,
      inputting data to be transmitted;
      generating a prefixed idle code string of a first predetermined length located before the data to be transmitted, which prefixed idle code string includes consecutive 8-bit idle codes;
      generating a postfixed idle code string of a second predetermined length located after the data to be transmitted, which postfixed idle code string includes consecutive 8-bit idle codes;
      switching between a voice PCM stream and a data PCM stream comprising the prefixed idle code string, the data to be transmitted and the postfixed idle code string, to transmit to the receiving terminal;
   at the receiving terminal,
      receiving a PCM stream from the transmitting terminal;
      detecting the prefixed idle code string and the postfixed idle code string from a received PCM stream; and
      receiving the data located between the prefixed idle code string and the postfixed idle code string,
   wherein each of the prefixed idle code string and the postfixed idle code string comprises a given number of consecutive idle codes and detecting the prefixed idle code string and the postfixed idle code string comprises:
      counting a number of consecutive idle codes;
      determining whether the number of consecutive idle codes reaches the given number; and
      when the number of consecutive idle codes is equal to the given number, switching an operation mode between a voice communication mode and a data communication mode.

2. The method according to claim 1, further comprising:
   at the receiving terminal,
      generating a silence PCM stream from when the prefixed idle code string of the first predetermined length is detected to when the postfixed idle code string of the second predetermined length is detected;
      decoding the voice PCM stream to reproduce a voice signal before detecting the prefixed idle code string and after detecting the postfixed idle code string; and
      decoding the silence PCM stream from when the prefixed idle code string of the first predetermined length is detected to when the postfixed idle code string of the second predetermined length is detected.

3. The method according to claim 1, wherein the PCM stream comprises the voice PCM stream and the data PCM stream and further comprising:
   receiving the voice PCM stream;
   decoding the received voice PCM with a decoder;
   detecting the prefixed idle code string in the data PCM stream;
   counting the number of consecutive codes in the detected prefixed idle code string;
   comparing the counted number of consecutive codes in the detected prefixed idle code string to a first given number;
   terminating the decoding of the voice PCM stream if the counted number of consecutive codes in the detected prefixed string is equal to the first given number;
   outputting the prefixed idle code string to a converter; and
   outputting silent frames to the decoder.

4. The method according to claim 3, further comprising:
   detecting a data start flag disposed after the prefixed code string;
   receiving the data from the data PCM stream based on the detected data start flag in the converter;
   detecting a data end flag disposed after the data;
   detecting the postfixed idle code string disposed after the data end flag;
   counting the number of consecutive codes in the detected postfixed idle code string;
   comparing the counted number of consecutive codes in the detected postfixed idle code string to a second given number; and
   restarting decoding of the voice PCM stream and terminating outputting the silent frames if the counted number of consecutive codes in the detected postfixed idle code string is equal to the second given number.

5. The method according to claim 1, wherein the voice communication system executes a G.711 protocol.

6. A system for transmitting a pulse code modulation (PCM) stream from a transmitting terminal to a receiving terminal through a network in a voice communication system, wherein the transmitting terminal comprises:
   a PCM encoder which encodes a voice signal to produce a voice PCM stream;
   a data converter which generates a data PCM stream comprising a prefixed idle code string of a first predetermined length located before data to be transmitted and a postfixed idle code string of a second predetermined length located after the data to be transmitted, which prefixed idle code string and postfixed idle code string include consecutive 8-bit idle codes;
   a first switch which switches between the voice PCM stream and the data PCM stream; and
   a transmitter which transmits a PCM stream outputted from the first switch to the receiving terminal, and
the receiving terminal comprises:
   a receiver which receives a PCM stream from the transmitting terminal;
   a detector which detects the prefixed idle code string and the postfixed idle code string from a received PCM stream;
   a PCM decoder which decodes the received PCM stream to reproduce a voice signal;
   a converter which converts the received PCM stream into parallel data; and
   a second switch which forwards the received PCM stream to the converter, when the prefixed idle code string is detected, and to the PCM decoder, when the postfixed idle code string is detected,
   wherein each of the prefixed idle code string and the postfixed idle code string comprises a given number of consecutive idle codes,
   the detector counts a number of consecutive idle codes and determines whether the number of consecutive idle codes reaches the given number, and
   when the number of consecutive idle codes is equal to the given number, an operation mode is switched between a voice communication mode and a data communication mode.

7. A receiving terminal for receiving a pulse code modulation (PCM) stream from a transmitting terminal through a network in a voice communication system, comprising:
   a receiver which receives a PCM stream from the transmitting terminal;
   a detector which detects a prefixed idle code string of a predetermined length and a postfixed idle code string of a predetermined length from a received PCM stream, which prefixed idle code string and postfixed idle code string include consecutive 8-bit idle codes;

a PCM decoder which decodes the received PCM stream to reproduce a voice signal;

a converter which converts the received PCM stream into parallel data; and a switch which forwards the received PCM stream to the converter, when the prefixed idle code string is detected, and to the PCM decoder, when the postfixed idle code string is detected, wherein each of the prefixed idle code string and the postfixed idle code string comprises a given number of consecutive idle codes, the detector counts a number of consecutive idle codes and determines whether the number of consecutive idle codes reaches the given number, and when the number of consecutive idle codes is equal to the given number, an operation mode is switched between a voice communication mode and a data communication mode.

8. The receiving terminal according to claim 7, further comprising:

a silence PCM generator which generates a silence PCM stream from when the prefixed idle code string of the predetermined length is detected to when the postfixed idle code string of the predetermined length is detected, and wherein the switch forwards the silence PCM stream to the PCM decoder after detecting the prefixed idle code string of the predetermined length and before detecting the postfixed idle code string of the predetermined length.

9. The receiving terminal according to claim 7, wherein the detector comprises:

a counter which counts the number of the consecutive idle codes; and a comparator which compares the number of the consecutive idle codes with the given number, wherein when the number of consecutive idle codes is equal to the given number, the comparator outputs a switching signal to the switch to change the operation mode from the voice communication mode to the data communication mode and vice versa.

10. A terminal for transmitting and receiving a pulse code modulation (PCM) stream to and from another terminal through a network in a voice communication system, comprising a transmitting section and a receiving section, wherein the transmitting section comprises:

a PCM encoder which encodes a voice signal to produce a voice PCM stream;

a data converter which generates a data PCM stream comprising a prefixed idle code string of a first predetermined length located before data to be transmitted and a postfixed idle code string of a second predetermined length located after the data to be transmitted, which prefixed idle code string and postfixed idle code string include consecutive 8-bit idle codes;

a switch which switches between the voice PCM stream and the data PCM stream; and a transmitter which transmits a PCM stream outputted from the switch to the receiving terminal, and the receiving section comprises:

a receiver which receives a PCM stream from the transmitting terminal;

a detector which detects a prefixed idle code string of a predetermined length and a postfixed idle code string of a predetermined length from a received PCM stream;

a PCM decoder which decodes the received PCM stream to reproduce a voice signal;

a converter which converts the received PCM stream into parallel data; and a switch which forwards the received PCM stream to the converter, when the prefixed idle code string is detected, and to the PCM decoder, when the postfixed idle code string is detected, wherein each of the prefixed idle code string and the postfixed idle code string comprises a given number of consecutive idle codes, the detector counts a number of consecutive idle codes and determines whether the number of consecutive idle codes reaches the given number wherein, and when the number of consecutive idle codes is equal to the given number, an operation mode is switched between a voice communication mode and a data communication mode.

11. A method for switching a communication mode between a voice communication mode and a data communication mode in a pulse code modulation-based (PCM) communication system from a transmitting terminal to a receiving terminal through a network, comprising:

at the transmitting terminal, generating a prefixed idle code string of a first predetermined length before data to be transmitted at a timing when a voice communication mode is changed to a data communication mode, which prefixed idle code string includes consecutive 8-bit idle codes;

generating a postfixed idle code string of a second predetermined length after the data to be transmitted at a timing when the data communication mode is changed to the voice communication mode, which postfixed idle code string includes consecutive 8-bit idle codes;

transmitting to the receiving terminal a voice PCM stream and a data PCM stream comprising the prefixed idle code string, the data to be transmitted, and the postfixed idle code string;

wherein each of the prefixed idle code string and the postfixed idle code string comprises a given number of consecutive idle codes, at the receiving terminal, detecting the prefixed idle code string and the postfixed idle code string from a received PCM stream by counting a number of consecutive idle codes and determining whether the number of consecutive idle codes reaches the given number; and switching the communication mode between the voice communication mode and the data communication mode depending on which one of the prefixed idle code string or the postfixed idle code string is detected, when the number of consecutive idle codes is equal to the given number.

12. A tangible computer-readable medium having a program recorded thereon, which program, when executed by a computer, causes the a computer to transmit and receive a pulse code modulation (PCM) stream to and from a terminal through a network in a voice communication system, comprising a transmitting section and a receiving section, wherein the transmitting section performs:

inputting data to be transmitted;

generating a prefixed idle code string of a first predetermined length located before the data to be transmitted, which prefixed idle code string includes consecutive 8-bit idle codes;

generating a postfixed idle code string of a second predetermined length located after the data to be transmitted, which postfixed idle code string includes consecutive 8-bit idle codes; and switching between a voice PCM stream and a data PCM stream comprising the prefixed idle code string, the data to be transmitted and the postfixed idle code string, to transmit to the receiving terminal, and the receiving section performs:

receiving a PCM stream from the transmitting terminal;

detecting the prefixed idle code string and the postfixed idle code string from a received PCM stream; and receiving the data located between the prefixed idle code string and the postfixed idle code string, wherein each of the prefixed idle code string and the postfixed idle code string comprises a given number of consecutive idle codes and detecting the prefixed idle code string and the postfixed idle code string comprises:

counting a number of consecutive idle codes;

determining whether the number of consecutive idle codes reaches the given number; and when the number of consecutive idle codes is equal to the given number, switching an operation mode between a voice communication mode and a data communication mode.

* * * * *